US009359019B2

United States Patent
Fujiwara et al.

(10) Patent No.: US 9,359,019 B2
(45) Date of Patent: Jun. 7, 2016

(54) UNHOOKING PREVENTION STRUCTURE FOR SPARE TIRE CARRIER

(71) Applicant: NIFCO INC., Yokohama, Kanagawa (JP)

(72) Inventors: Kensuke Fujiwara, Yokohama (JP); Hironori Narita, Kariya (JP); Kunihiro Matsuno, Kariya (JP); Yoshiyuki Houdou, Kariya (JP)

(73) Assignee: NIFCO INC., Yokohama-Shi, Kanagawa (JP)

( * ) Notice: Subject to any disclaimer, the term of this patent is extended or adjusted under 35 U.S.C. 154(b) by 0 days.

(21) Appl. No.: 14/395,714

(22) PCT Filed: Apr. 16, 2013

(86) PCT No.: PCT/JP2013/061310
§ 371 (c)(1),
(2) Date: Oct. 20, 2014

(87) PCT Pub. No.: WO2013/161632
PCT Pub. Date: Oct. 31, 2013

(65) Prior Publication Data
US 2015/0266523 A1   Sep. 24, 2015

(30) Foreign Application Priority Data

Apr. 23, 2012  (JP) .................................. 2012-097575

(51) Int. Cl.
*B62D 43/00* (2006.01)
*B60R 7/00* (2006.01)
*B62D 43/04* (2006.01)

(52) U.S. Cl.
CPC ..................................... *B62D 43/04* (2013.01)

(58) Field of Classification Search
CPC ........ B62D 43/04; B62D 43/00; B62D 43/02; B62D 43/08
USPC ............ 224/42.12, 42.23, 42.19, 42.2, 42.21, 224/42.28, 42.32
See application file for complete search history.

(56) References Cited

U.S. PATENT DOCUMENTS

| 3,187,914 A | * | 6/1965 | Peras | ..................... B62D 43/04 224/42.21 |
| 3,494,493 A | * | 2/1970 | Fowler | ................... B62D 43/04 414/466 |

(Continued)

FOREIGN PATENT DOCUMENTS

| FR | 2670171 A1 | 6/1992 |
| JP | S40-11781 Y2 | 4/1965 |

(Continued)

OTHER PUBLICATIONS

PCT/ISA/210, "International Search Report for PCT/JP2013/061310".

*Primary Examiner* — Brian D Nash
*Assistant Examiner* — Derek Battisti
(74) *Attorney, Agent, or Firm* — Manabu Kanesaka

(57) ABSTRACT

An unhooking prevention structure for a spare tire carrier includes a carrier main body portion for holding a spare tire below a floor plate of an automobile; a bolt including a head portion and a shaft portion passed through the floor plate leaving the head portion on the floor plate, and the shaft portion including a male screw below the floor plate; a hook hooked onto the carrier main body portion and including a female screw screwed into the male screw of the bolt to lift the carrier main body portion by rotating the bolt around an axis; and a rotation restriction mechanism including a fitting cap attached to the head portion of the bolt so as not to rotate around the axis relative to the bolt, and preventing the hook from disengaging the bolt by prohibiting the fitting cap from rotating at a predetermined angle or more.

5 Claims, 5 Drawing Sheets

(56) References Cited

U.S. PATENT DOCUMENTS

| | | | | |
|---|---|---|---|---|
| 3,547,289 A * | 12/1970 | Steele | B62D 43/002 414/463 |
| 3,650,424 A * | 3/1972 | Dumas | B62D 43/04 414/466 |
| 3,735,883 A * | 5/1973 | Hrivnyak | B62D 43/04 414/466 |
| 3,904,093 A * | 9/1975 | Hanela | B62D 43/04 224/42.21 |
| 3,940,959 A * | 3/1976 | Anderson | B62D 43/007 70/259 |
| 4,093,088 A * | 6/1978 | Hildebrandt | B62D 43/04 224/42.21 |
| 4,294,088 A * | 10/1981 | Barr | B62D 43/00 224/42.25 |
| 4,363,431 A * | 12/1982 | Muschalek | B62D 43/04 224/403 |
| 4,428,513 A * | 1/1984 | Delmastro | B62D 43/04 224/42.21 |
| 2006/0001270 A1 * | 1/2006 | Kobayashi | E05C 19/00 292/2 |
| 2010/0314422 A1 * | 12/2010 | Yamada | B62D 43/04 224/42.2 |

FOREIGN PATENT DOCUMENTS

| | | |
|---|---|---|
| JP | S61-87782 U | 6/1986 |
| JP | S62-40862 Y2 | 10/1987 |
| JP | H03-25003 U | 3/1991 |
| JP | H04-84909 U | 7/1992 |
| JP | 2011-020652 A | 2/2011 |
| WO | 2011/061829 A1 | 5/2011 |

* cited by examiner

UNHOOKING PREVENTION STRUCTURE FOR SPARE TIRE CARRIER

RELATED APPLICATIONS

The present application is National Phase of International Application No. PCT/JP2013/061310 filed Apr. 16, 2013, and claims priority from Japanese Application No. 2012-097575 filed Apr. 23, 2012.

FIELD OF TECHNOLOGY

The present invention relates to an unhooking prevention structure for a spare tire carrier supporting a spare tire under a floor of an automobile.

BACKGROUND ART

In a Japanese Patent Application Publication No. 2011-020652, there is described a conventional technology related to a spare tire carrier of an automobile. In such spare tire carrier 100, as shown in FIG. 9, a main body portion 101 placing a spare tire T is connected to a frame material 100f forming a floor portion of a vehicle body by a hinge 103 at a front end so as to lift up a rear portion thereof or unload on a road surface. The main body portion 101 can be held by being suspended under a floor plate 100b of the automobile by a structure in which a suspension bolt 105 and a hook 106 are combined.

The suspension bolt 105 includes a hexagonal head portion 105h and a shaft portion 105j in which a male screw is formed. In the suspension bolt 105, in a state wherein the head portion 105h remains on the floor plate, the shaft portion 105j passes through a through hole of the floor plate 100b of the automobile. In the hook 106, there is provided a cylindrical portion 106t including a female screw on an upper portion. The female screw is screwed into the male screw of the shaft portion 105j of the suspension bolt 105. When a back end portion of the main body portion 101 of the carrier is hooked onto the hook 106, the hook 106 comes to an unrotatable state. Therefore, by rotating the suspension bolt 105, the male screw is screwed into the female screw of the hook 106 so as to raise the hook 106.

SUMMARY OF THE INVENTION

In a case wherein the suspension bolt 105 is insufficiently fastened, the suspension bolt 105 loosens with time by a vibration of the automobile and the like, and the hook 106 descends so as to sometimes come out of the main body portion 101 of the carrier.

As one aspect of the present invention, an unhooking prevention structure for a spare tire carrier can be attained. This structure comprises a carrier main body portion for placing a spare tire and holding the spare tire under a floor plate of an automobile; and a bolt including a shaft portion and a head portion on a center axis, wherein the shaft portion is passed through the floor plate disposing the head portion on the floor plate, and the shaft portion includes a male screw below the floor plate. This structure also comprises a hook hooked onto the carrier main body portion and including a female screw screwed into the male screw of the bolt so as to lift up the carrier main body portion by rotating the bolt around the center axis. This structure also comprises a rotation restriction mechanism including a fitting cap removably attached to the head portion of the bolt so as not to rotate around the center axis relative to the bolt, and preventing the hook from disengaging the bolt by prohibiting the fitting cap from rotating at a predetermined angle or more.

In a state wherein the fitting cap is attached to the head portion of a suspension bolt, when the suspension bolt rotates, the fitting cap also rotates. However, when the fitting cap attempts to rotate at the predetermined angle or more, a rotation is restricted. Namely, through the fitting cap, a rotation of the suspension bolt is indirectly restricted. Consequently, even if a screw of the suspension bolt is insufficiently fastened, the hook can be prevented from descending with time and from coming out of the carrier main body portion.

BEST MODE FOR CARRYING OUT THE INVENTION

Figure 1:
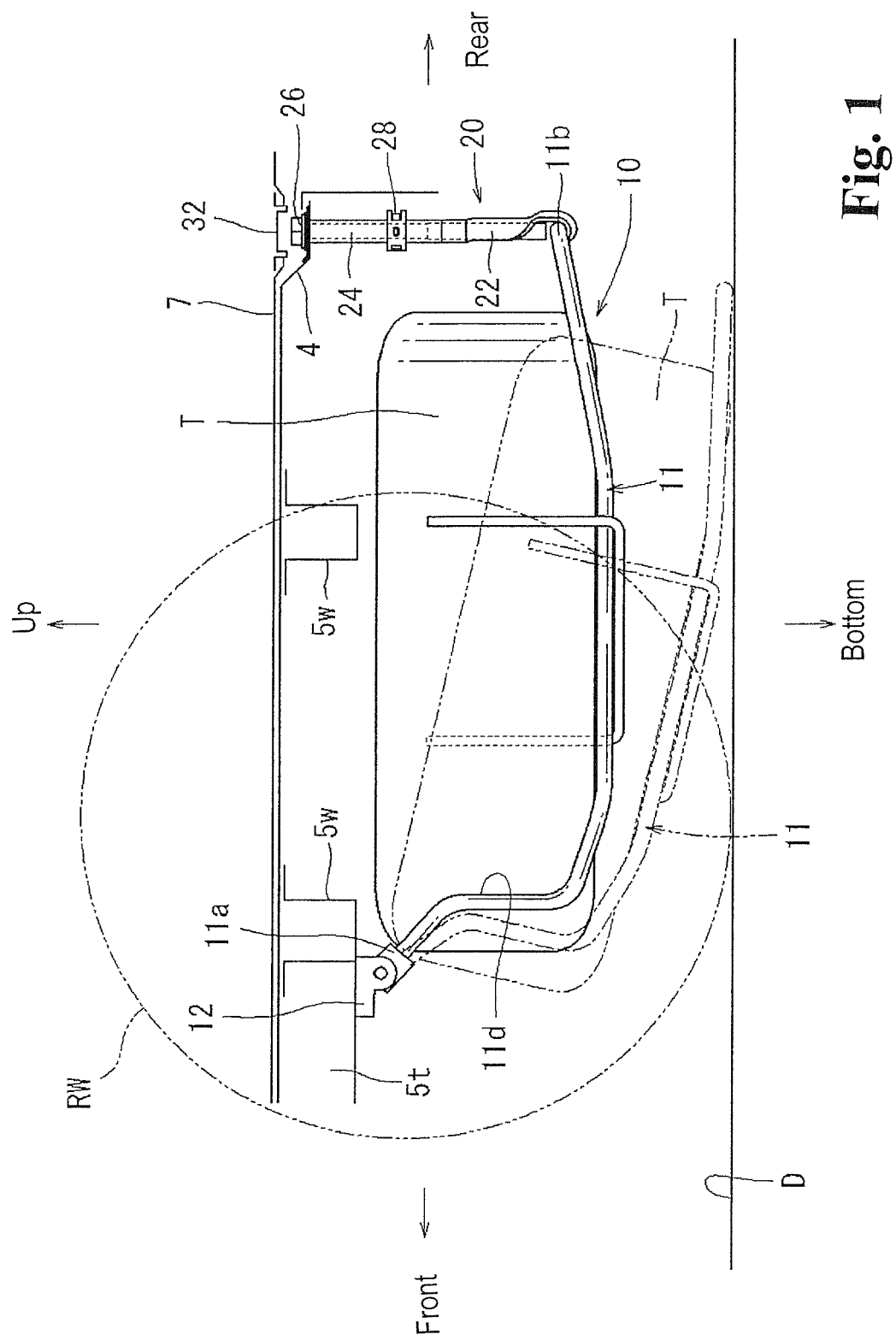
FIG. 1 is an overall side view showing a spare tire carrier according to one aspect of the present invention.

Hereinafter, a spare tire carrier according to various embodiments of the present invention will be explained with reference to FIG. 1 to FIG. 8. Incidentally, the following explanation and each direction of front and back, and up and down in the drawings are determined based on an automobile comprising a spare tire carrier.

SUMMARY

As shown in FIG. 1, a spare tire carrier 10 is a device for holding a spare tire T between especially right-and-left rear wheels RW (see a chain double-dashed line) under a floor at a rear portion of the automobile. There, a rear floor portion of the automobile comprises a plurality of horizontal frame members 5w extending in a vehicle width direction; and a vertical frame member 5t extending forward from a position of the horizontal frame member 5w on a front side, and by the frame members 5w and 5t, a rear portion of a floor plate 4 is supported from below. Furthermore, the floor plate 4 (especially, the rear portion thereof) is partially covered by a decoration plate 7 from above. The carrier 10 comprises a main body portion 11; a rotation support bracket 12 connecting a front end portion of the main body portion 11 to the vertical frame member 5t of the automobile; and a locking support portion 20 suspending and supporting a back end portion 11b of the main body portion 11 of the carrier 10 in the floor plate 4 of the automobile.

The main body portion 11 of the carrier 10 is formed in such a way as to place the spare tire T in a state of lying sideways. The main body portion 11 can be formed in a shelf manner by appropriately bending, for example, a metallic pipe member. The main body portion 11 can be also formed in such a way as to hold the spare tire T in a radial direction. For example, at a front portion of the main body portion 11, there may be also provided a vertical pipe portion 11d holding an outer peripheral face of the spare tire T from front. Then, at an upper end position of the vertical pipe portion 11d, there is provided a rotation base end portion 11a connected to the rotation support bracket 12 to be vertically rotatable. Consequently, as shown in FIG. 1, the main body portion 11 can turn up and down around the rotation support bracket 12 between a position (see a chain double-dashed line) contacting with a road surface D and a horizontal position.

[Locking Support Portion]

Figure 2:
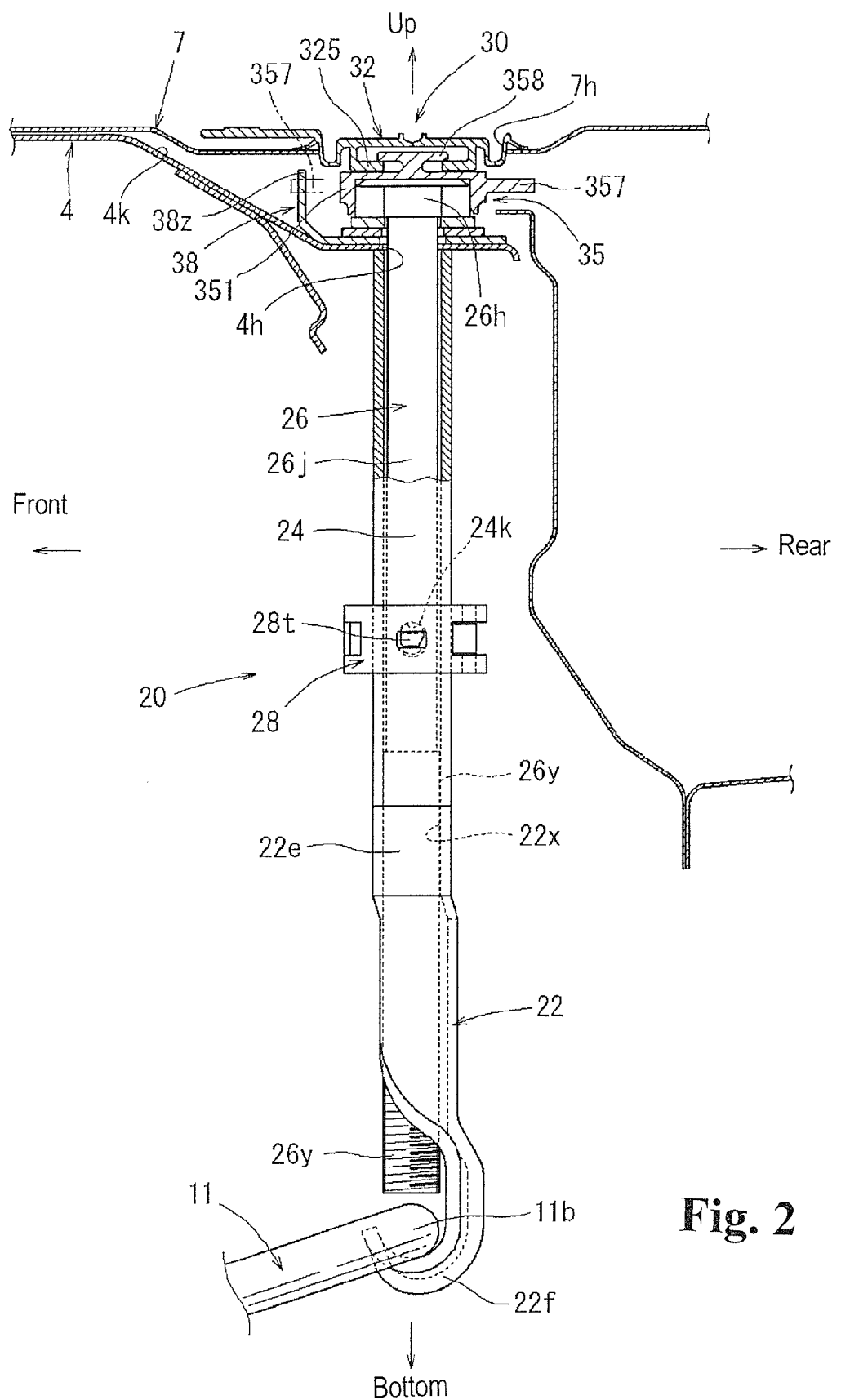
FIG. 2 is a side view showing a locking support portion of the spare tire carrier in FIG. 1.

As shown in FIG. 1, the locking support portion 20 of the carrier 10 is a member for suspending the back end portion 11b of the main body portion 11 in the rear portion of the floor plate 4 of the automobile in a state of hooking the back end portion 11b of the main body portion 11. As shown in FIG. 2, the locking support portion 20 includes a hook 22 hooking and supporting the back end portion 11b of the main body portion 11 of the carrier 10 from below; a suspension bolt 26 connected to the hook 22 by a screw engagement between screws; and a spacer 24.

The hook 22 includes a main body portion 22f and a cylindrical portion 22e provided on an upper side of the main body portion 22f of the hook 22, and on an inner peripheral face of the cylindrical portion 22e, there is formed a female screw 22x.

The suspension bolt 26 includes a head portion 26h having a hexagonal shape, and a shaft portion 26j in which a male screw 26y is formed at a tip portion, and in a state wherein the head portion 26h is located above, the shaft portion 26j is passed through a through hole 4h of the floor plate 4. Then, the male screw 26y of the shaft portion 26j of the suspension bolt 26 is screwed into the female screw 22x of the hook 22. There, as shown in FIG. 2, the through hole 4h of the floor plate 4 is formed at a bottom position of a depressed portion 4k of the floor plate 4, and in the depressed portion 4k, there is housed the head portion 26h of the suspension bolt 26. Also, in a decoration plate 7 covering the depressed portion 4k of the floor plate 4, there is formed an opening 7h for a bolt operation at a position corresponding to the head portion 26h of the suspension bolt 26.

The spacer 24 is a cylindrical member passed through the shaft portion 26j of the suspension bolt 26. The spacer 24 is used for positioning a height of the hook 22 from the road surface D when the suspension bolt 26 is completely fastened. A length of the spacer 24 can be set according to a vehicle type.

There can be also provided a clamp 28 preventing the spacer 24 from falling off from the suspension bolt 26 when the hook 22 is unfastened from the suspension bolt 26. In side wall portions of the spacer 24, there is formed a through hole 24k at a position to which the clamp 28 is attached. A claw 28t of the clamp 28 enters into the spacer 24 from the through hole 24k. Then, the claw 28t of the clamp 28 is caught on an upper end of the male screw 26y formed in the shaft portion 26j of the suspension bolt 26 so as to prevent the spacer 24 from falling off relative to the suspension bolt 26.

[Hook Disconnection Prevention Mechanism]

Even if the suspension bolt 26 is not tightly fastened, a hook disconnection prevention mechanism 30 prevents the suspension bolt 26 from rotating due to a vibration of the automobile and the like and further loosening so as to prevent the hook 22 from descending and coming off from the main body portion 11 of the carrier 10. As one aspect, the hook disconnection prevention mechanism 30 can be formed by a seat portion with a claw 38 fixed to a floor plate 4 side of the automobile, and a fitting cap 35 overlaid on the head portion 26h of the suspension bolt 26.

Figure 4:
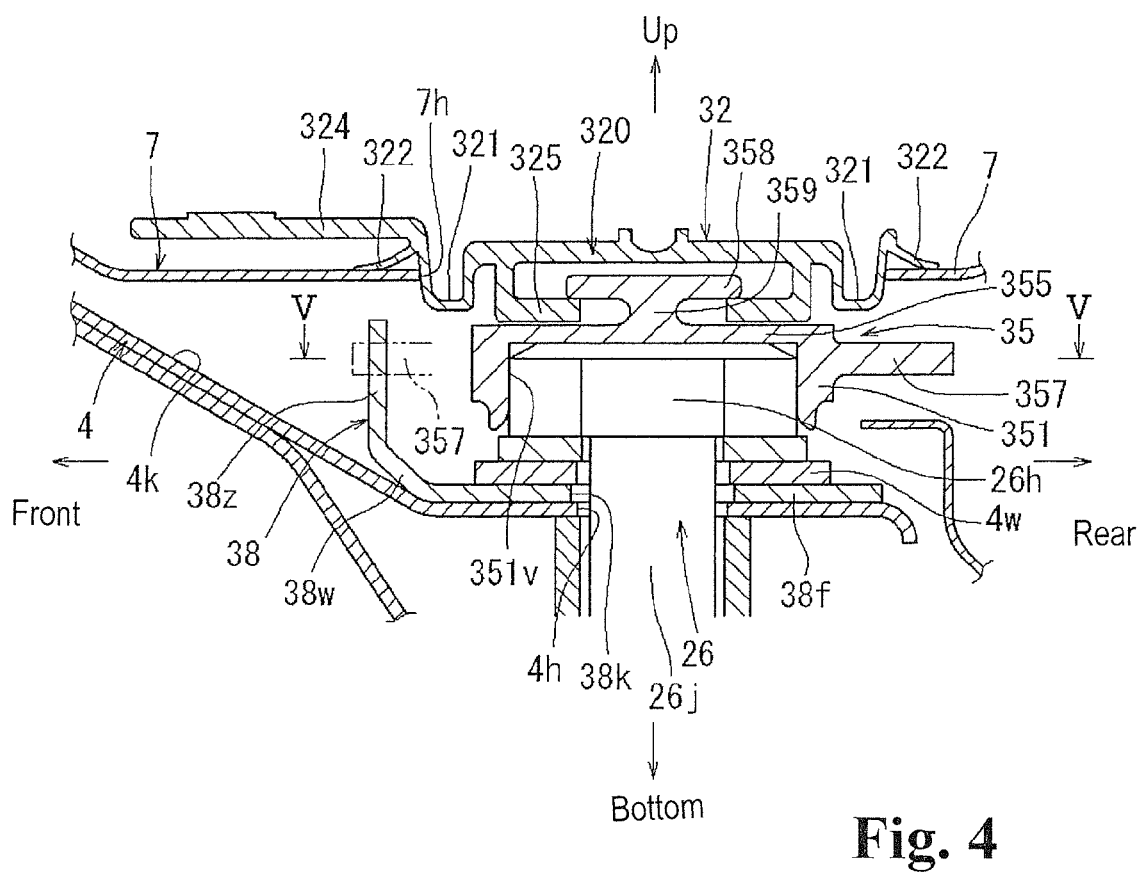
FIG. 4 is a vertical cross-sectional view showing a rotation restriction mechanism used at the spare tire carrier in FIG. 1.
Figure 8:
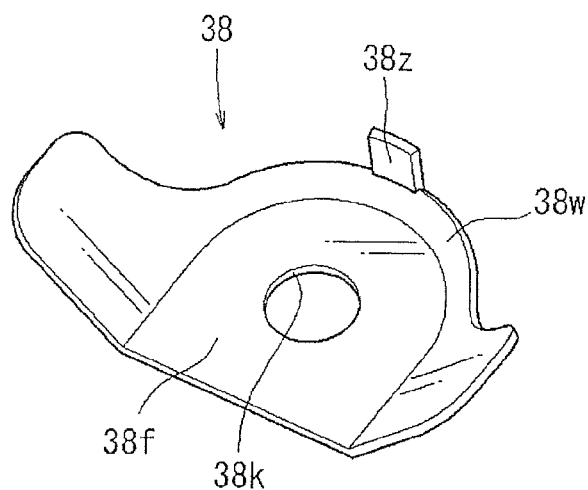
FIG. 8 is a perspective view of a seat portion with a claw forming the rotation restriction mechanism.
Figure 9:
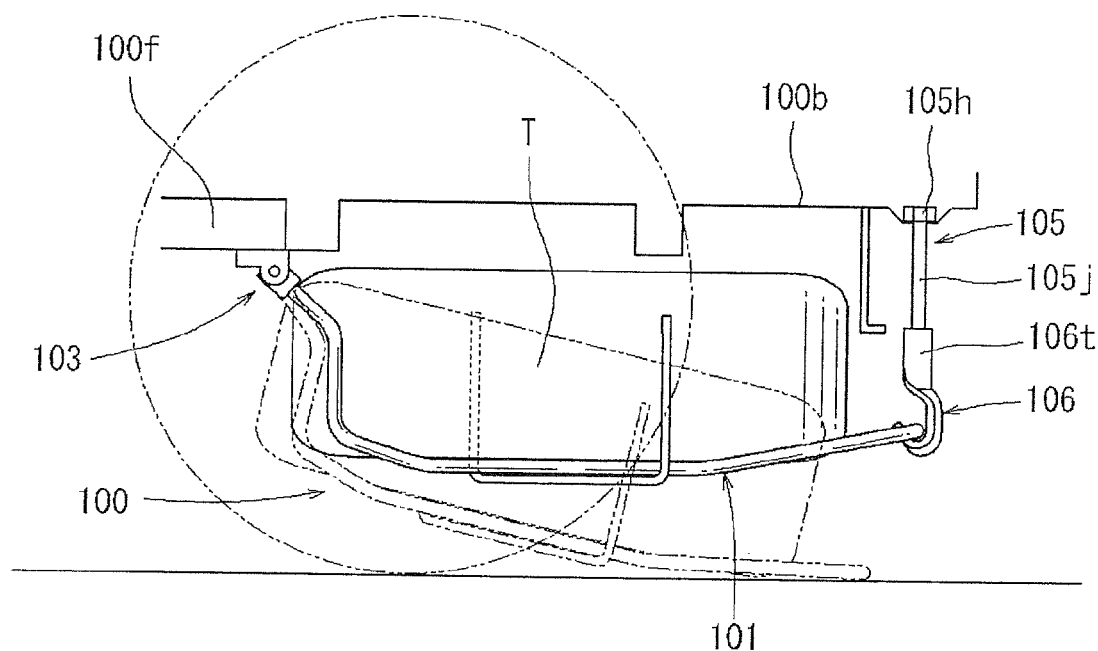
FIG. 9 is an overall side view showing a conventional spare tire carrier.

As shown in FIG. 8 and the like, the seat portion with a claw 38 includes a flat plate portion 38f having approximately a U shape in which a through hole 38k is formed at a center through which the shaft portion 26j of the suspension bolt 26 is passed. The seat portion with a claw 38 includes an inclined wall portion 38w rising upward while enlarging a diameter from a periphery of the flat plate portion 38f, and the flat plate portion 38f is surrounded by the inclined wall portion 38w from three sides. Also, at a center position in a circumferential direction of the inclined wall portion 38w, there is provided a vertical claw portion 38z having a square flat plate shape formed in such a way as to protrude upward. As shown in FIG. 4, the seat portion with a claw 38 is housed in the depressed portion 4k of the floor plate 4 so as to be set in such a way that the flat plate portion 38f of the seat portion with a claw 38 is overlapped with a bottom of the depressed portion 4k. At that time, the seat portion with a claw 38 is provided such that the through hole 38k of the flat plate portion 38f becomes concentric with the through hole 4h of the floor plate 4, and at a position where the vertical claw portion 38z becomes a front end side. Preferably, the seat portion with a claw 38 is formed by a steel plate so as to be fixed to the floor plate 4 by welding and the like. When the shaft portion 26j of the suspension bolt 26 is passed through the through hole 38k of the flat plate portion 38f of the seat portion with a claw 38, a plurality of washers 4w is set on the flat plate portion 38f.

Figure 5:
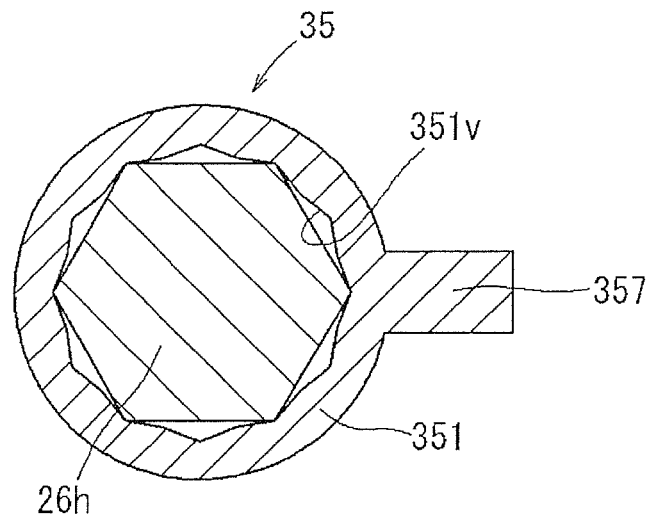
FIG. 5 is a cross-sectional view taken along a line V-V of the mechanism in FIG. 4.

When the fitting cap 35 is overlaid on the head portion 26h of the suspension bolt 26, the fitting cap 35 comes to a state which cannot relatively rotate around an axis relative to the suspension bolt 26. As shown in FIG. 4, FIG. 5, and the like, the fitting cap 35 includes a cylindrical portion 351 having approximately a cylindrical shape, and a top plate portion 355 closing an upper side of the cylindrical portion 351. Preferably, the fitting cap 35 is made of resin. On an inner peripheral face of the cylindrical portion 351, there are formed shallow V-shaped grooves 351v in which corner portions of the hexagonal columnar head portion 26h of the suspension bolt 26 can be fitted in an axial direction. Preferably, the V-shaped grooves 351v are provided at 12 portions every 30° in a circumferential direction. When the fitting cap 35 is overlaid on the head portion 26h of the suspension bolt 26, and the V-shaped grooves 351v at 6 portions and the corner portions of the head portion 26h are fitted, the suspension bolt 26 and the fitting cap 35 are maintained in a state which cannot relatively rotate. Also, in the cylindrical portion 351, there is formed an arm portion 357 protruding outward in a radial direction from an outer peripheral face thereof. The arm portion 357 is set to have a length in which a lateral face of the arm portion 357 can abut against the vertical claw portion 38z of the seat portion with a claw 38 when the fitting cap 35 rotates around an axis.

In a state wherein the male screw 26y of the suspension bolt 26 is insufficiently fastened relative to the female screw 22x of the hook 22 of the aforementioned carrier 10, when the suspension bolt 26 rotates, the fitting cap 35 overlaid on the head portion 26h of the suspension bolt 26 also rotates together with the suspension bolt 26. Then, from a state shown in FIG. 4, when the suspension bolt 26 and the fitting cap 35 rotate counterclockwise (a loose direction) approximately at 180° viewed from above, the arm portion 357 of the suspension bolt 26 abuts against the vertical claw portion 38z of the seat portion with a claw 38 fixed to the floor plate 4 side. Thereby, the fitting cap 35 and the suspension bolt 26 do not rotate further so as not to loosen. As a result, the hook 22 is prevented from descending and coming off from the back end portion 11b of the main body portion 11 of the carrier 10.

[Floor Cap]

Figure 3:
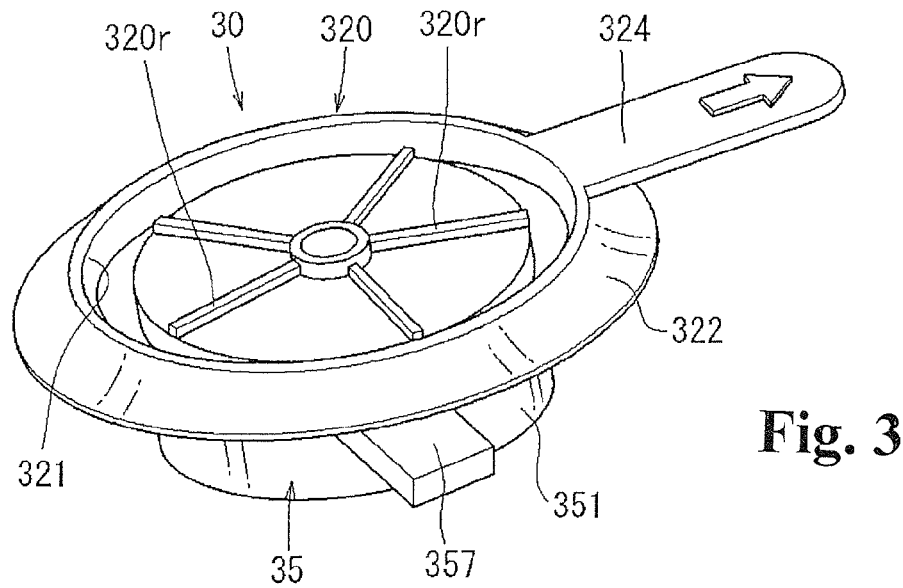
FIG. 3 is a perspective view showing a floor cap and a fitting cap used at the spare tire carrier in FIG. 1.

As shown in FIG. 4, in the decoration plate 7, there can be provided a floor cap 32 closing the opening 7h for the bolt operation. The floor cap 32 includes a rubber cap main body portion 320 closing the opening 7h for the bolt operation of the decoration plate 7; and a grip portion 324 having a band plate shape and gripped when the cap main body portion 320 is removed from the opening 7h. As shown in FIG. 3 and FIG. 4, the cap main body portion 320 is formed in an approximately disk shape, and on a surface side of the cap main body portion 320, there is formed a square groove 321 having an approximately square shape in a cross sectional view along an outer circumference of the cap main body portion 320. A wall portion of the square groove 321 forms a projection protruding to a reverse face side of the cap main body portion 320, and the projection portion is fitted in the opening 7h of the decoration plate 7 while elastically deforming. Furthermore, outside the square groove 321 of the cap main body portion 320, there is provided a lip portion 322 pressing a peripheral edge of the opening 7h from above for sealing. Also, on the surface side of the cap main body portion 320, there are formed ribs 320r radially extending from a center of the cap main body portion 320 at equal intervals in a circumferential direction.

[Connection between the Floor Cap and the Fitting Cap]

Figure 7:
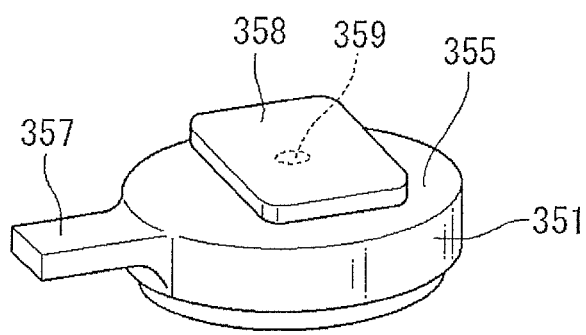
FIG. 7 is a perspective view wherein the fitting cap is viewed obliquely from above.

As one aspect, as shown in FIG. 4, the fitting cap 35 and the floor cap 32 can be formed so as to be mutually connected. As shown in FIG. 7, on an upper face of the top plate portion 355 of the fitting cap 35, there is formed a connection plate portion 358 for connecting the fitting cap 35 to the floor cap 32. The connection plate portion 358 is a square plate portion and is provided parallel to the top plate portion 355. As shown in FIG. 4, a lower face center of the connection plate portion 358 is connected to a center of the upper face of the top plate portion 355 by a shaft portion 359.

Figure 6:
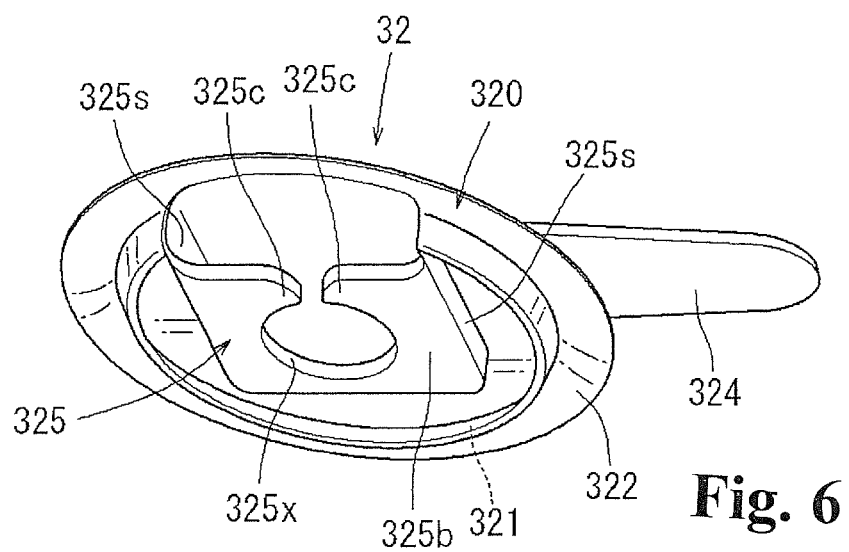
FIG. 6 is a perspective view wherein the floor cap is viewed obliquely from below.

As shown in FIG. 6, the floor cap 32 includes a hook-shaped connection portion 325 for connecting the cap main body portion 320 to the fitting cap 35. Preferably, the hook-shaped connection portion 325 is made of resin, and one portion is embedded in the cap main body portion 320 so as to be integrated. The hook-shaped connection portion 325 is provided inside the wall portion forming the square groove 321 at a reverse face center of the cap main body portion 320. As shown in FIG. 4, the hook-shaped connection portion 325 is formed by L-form guide walls in a cross-sectional view forming a space in which the connection plate portion 358 of the fitting cap 35 can be inserted from a direction along the cap main body portion 320. Specifically, as shown in FIG. 6, the guide walls of the hook-shaped connection portion 325 includes vertical plate portions 325s forming vertical walls of the space to be inserted, and a bottom plate portion 325b forming a horizontal wall. An upper end portion of the vertical plate portions 325s are connected to an upper plate portion embedded in the cap main body portion 320. A width of the space where the hook-shaped connection portion 325 forms, i.e., an interval between the vertical plate portions 325s is set in a value sufficiently larger than a width of the connection plate portion 358 of the fitting cap 35 in such a way that, as shown in FIG. 4, the fitting cap 35 can turn around the axis relative to the floor cap 32.

At an approximately center of the bottom plate portion 325b, there is formed a through hole 325x receiving the shaft portion 359 of the fitting cap 35. An inner diameter of the through hole 325x is set in a value sufficiently larger than an outer diameter of the shaft portion 359 of the fitting cap 35.

Also, the bottom plate portion 325b includes narrow notches interconnecting an outside and the through hole 325x. The bottom plate portion 325b at a center on an entrance side includes a pair of pressure wall portions 325c forming the notches, and the pressure wall portions 325c are formed to be elastically deformable by a predetermined external force or more. A width of the notch, i.e., an interval between the pair of pressure wall portions 325c is set to be wide on the outside, and be narrow on the inside (a through hole 325x side). Then, a maximal portion of the interval between the pressure wall portions 325c is set to be smaller than the outer diameter of the shaft portion 359 of the fitting cap 35.

In order to connect the floor cap 32 and the fitting cap 35, as shown in FIG. 4, the connection plate portion 358 of the fitting cap 35 is inserted into the space where the hook-shaped connection portion 325 forms from the direction along the cap main body portion 320 of the floor cap 32. At that time, first, the shaft portion 359 of the fitting cap 35 hits at the pair of pressure wall portions 325c of the hook-shaped connection portion 325 of the floor cap 32. The connection plate portion 358 of the fitting cap 35 is further pressed into the hook-shaped connection portion 325 of the floor cap 32, so that while elastically deforming the pair of pressure wall portions 325c of the hook-shaped connection portion 325, the shaft portion 359 of the fitting cap 35 passes through therebetween. Thereby, the shaft portion 359 of the fitting cap 35 is inserted into the through hole 325x of the hook-shaped connection portion 325, and a connection between the fitting cap 35 and the floor cap 32 is completed. After the connection, the pair of pressure wall portions 325c of the floor cap 32 returns to an original state, and the shaft portion 359 of the fitting cap 35 is held inside the through hole 325x of the hook-shaped connection portion 325 of the floor cap 32. A position of the fitting cap 35 can be shifted only for a predetermined amount in a horizontal direction relative to the floor cap 32 while the fitting cap 35 is being connected to the floor cap 32, and the fitting cap 35 can turn around the axis relative to the floor cap 32.

[Usage of the Spare Tire Carrier]

In a case wherein the spare tire T is stored under the floor of the automobile using the carrier 10, first, the floor cap 32 is pulled up with the grip portion 324, and the cap main body portion 320 of the floor cap 32 is removed from the opening 7h for the bolt operation of the decoration plate 7. At that time, the fitting cap 35 connected to the floor cap 32 is also removed from the head portion 26h of the suspension bolt 26. Next, the suspension bolt 26 is rotated through the opening 7h using a spanner and the like so as to loosen a screw engagement between the male screw 26y and the female screw 22x and allow the hook 22 to descend. Then, the hook 22 is removed from the back end portion 11b of the main body portion 11 of the carrier 10, and the main body portion 11 is turned downward up to the position contacting with the road surface D shown with the chain double-dashed line in FIG. 1. Therewith, the spare tire T can be placed relative to the main body portion 11 of the carrier 10.

After the spare tire T is placed, the main body portion is lifted upward up to a position where the spare tire T comes to an approximately horizontal direction. Then, the hook is hooked onto the back end portion 11b of the main body portion 11 of the carrier 10 from below. Therewith, the hook 22 becomes unrotatable around an axis. The suspension bolt 26 is rotated, and the male screw 26y is screwed into the female screw 22x of the hook 22, so that the main body portion 11 of the carrier 10 is pulled up by the hook 22, and the spare tire T is held under the floor of the automobile. Next, the fitting cap 35 is overlaid on the head portion 26h of the suspension bolt 26 while being connected to the floor cap 32. The cap main body portion 320 of the floor cap 32 is fitted into the opening 7h of the decoration plate 7 so as to close the opening 7h, and an operation is completed. There, the fitting cap 35 is connected relative to the cap main body portion 320 of the floor cap 32 in such a way as to allow a position shift only for the predetermined amount in the horizontal direction (a direction perpendicular to a center axis). Consequently, in manufacturing, even when a variation occurs at a position of the opening 7h relative to a center axis of the suspension bolt 26, the variation can be absorbed.

Advantageous Effects of the Embodiments

As described above, in a state wherein the fitting cap 35 is overlaid on the head portion 26h of the suspension bolt 26, for example, when the suspension bolt 26 rotates and starts to loosen, the fitting cap 35 also rotates. However, by the arm portion 357 and the vertical claw portion 38z, the fitting cap 35 is restricted so as not to rotate at a predetermined angle or more. Namely, the arm portion 357 and the vertical claw portion 38z indirectly restrict the suspension bolt 26 from rotating through the fitting cap 35. Consequently, even if the male screw 26y of the suspension bolt 26 is insufficiently fastened relative to the female screw 22x of the hook 22, the hook 22 does not descend further than that so as to prevent the hook 22 from coming out of the main body portion 11 of the carrier 10 with time.

Also, the fitting cap 35 is relatively rotatably connected to the floor cap 32, so that even in a state wherein the floor cap 32 is fixed to the decoration plate 7, the fitting cap 35 can integrally rotate with the suspension bolt 26. Also, the fitting cap 35 is connected to the floor cap 32 with respect to an axial direction, so that when the floor cap 32 is removed from the opening 7h for the bolt operation of the decoration plate 7, the fitting cap 35 can be simultaneously removed from the head portion 26h of the suspension bolt 26. Furthermore, when the floor cap 32 is attached to the opening 7h, the fitting cap 35 can be overlaid on the head portion 26h of the suspension bolt 26. Also, the arm portion 357 is provided in the fitting cap 35, and by abutting the arm portion 357 against the vertical claw portion 38z of the seat portion with a claw 38, a rotation is restricted so as to simplify a structure and suppress cost-up.

Modified Examples

Although various embodiments of the present invention have been explained with specific forms, it is obvious for any person skilled in the art that many displacements, improvements, and modifications can be possible provided that they do not exceed an object of the present invention. Namely, the embodiments of the present invention are intended to include all displacements, improvements, and modifications to fulfill a real intention and the object of the attached claims. The embodiments of the present invention are not limited to specified forms, and for example, the following modification can be possible.

In the hook disconnection prevention mechanism 30 according to the present embodiments, there has been shown an example in which the arm portion 357 is provided in the fitting cap 35, and by abutting the arm portion 357 against the vertical claw portion 38z of the seat portion with a claw 38, a turn between the fitting cap 35 and the suspension bolt 26 is attempted to stop. However, for example, an end portion of the fitting cap 35 is connected to the floor plate 4 by a hinge mechanism and the like so as to cover or uncover the head portion 26h of the suspension bolt 26, and to attempt to stop the turn of the suspension bolt 26 as well.

Also, in the present embodiments, in an automobile having a structure covered with the decoration plate 7 of the floor plate 4, there has been shown an example in which the floor cap 32 closing the opening 7h for the bolt operation of the decoration plate 7 thereof and the fitting cap 35 are connected. However, in an automobile without the decoration plate 7, the floor cap 32 can be omitted.

What is claimed is:

1. An unhooking prevention structure for a spare tire carrier, comprising:
   a carrier main body portion for placing a spare tire and holding the spare tire below a floor plate of an automobile;
   a bolt including a shaft portion and a head portion on an axis, wherein the shaft portion is passed through the floor plate disposing the head portion on the floor plate, and the shaft portion includes a male screw below the floor plate;
   a hook hooked onto the carrier main body portion and including a female screw screwed into the male screw of the bolt so as to lift up the carrier main body portion by rotating the bolt around the axis;
   a rotation restriction mechanism including a fitting cap removably attached to the head portion of the bolt so as not to rotate around the axis relative to the bolt, and preventing the hook from disengaging the bolt by prohibiting the fitting cap from rotating at a predetermined angle or more;
   a decoration plate covering the floor plate from above, and formed with an opening for operating the bolt; and
   a floor cap removably placed for closing the opening of the decoration plate,
   wherein the fitting cap is connected to a lower side of the floor cap so as to relatively rotate around the axis relative to the floor cap.

2. An unhooking prevention structure for a spare tire carrier according to claim 1, wherein the fitting cap is connected relative to the floor cap so as to be displaced in a direction perpendicular to the axis.

3. An unhooking prevention structure for a spare tire carrier according to claim 1, wherein the rotation restriction mechanism further comprises a claw member extending upward from the floor plate; and a projection protruding outward in a radial direction from an outer peripheral face of the fitting cap, and
   when the fitting cap rotates, the projection abuts against the claw member so as to prohibit the fitting cap from rotating further.

4. An unhooking prevention structure for a spare tire carrier according to claim 1, wherein the fitting cap comprises a connection plate portion,
   the floor cap comprises a cap main body portion and a connection portion connecting the cap main body portion to the fitting cap, and
   the connection plate portion rotatably engages the connection portion.

5. An unhooking prevention structure for a spare tire carrier according to claim 4, wherein the connection portion has a hook-shaped portion,
   the fitting cap comprises a top plate portion under the connection plate portion, and the hook-shaped portion engages between the connection plate portion and the top plate portion so that when the floor cap is pulled up, the fitting cap is removed together with the floor cap.

* * * * *